US009347771B2

(12) United States Patent
Hagino et al.

(10) Patent No.: US 9,347,771 B2
(45) Date of Patent: May 24, 2016

(54) SPHERICAL SHAPE MEASUREMENT METHOD AND APPARATUS

(71) Applicant: MITUTOYO CORPORATION, Kawasaki-shi, Kanagawa (JP)

(72) Inventors: Takeshi Hagino, Ibaraki (JP); Yuichiro Yokoyama, Ibaraki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 0 days.

(21) Appl. No.: 14/800,230

(22) Filed: Jul. 15, 2015

(65) Prior Publication Data
US 2016/0018216 A1    Jan. 21, 2016

(30) Foreign Application Priority Data

Jul. 17, 2014    (JP) .................................. 2014-147227

(51) Int. Cl.
| G01B 11/02 | (2006.01) |
| G01B 11/24 | (2006.01) |
| G01B 9/02 | (2006.01) |
| G01B 5/00 | (2006.01) |

(52) U.S. Cl.
CPC .......... *G01B 11/2441* (2013.01); *G01B 5/0004* (2013.01); *G01B 9/02039* (2013.01); *G01B 9/02041* (2013.01); *G01B 2210/52* (2013.01)

(58) Field of Classification Search
CPC .. G01B 11/24; G01B 11/2441; G01B 5/0004; G01B 9/02039; G01B 9/02041; G01B 2210/52; G01B 2210/62; G06T 7/0024; G06T 7/0026

USPC ......................................................... 356/512
See application file for complete search history.

(56) References Cited

U.S. PATENT DOCUMENTS 4,414,748 A * 11/1983 Gauler ................... G01B 5/201
                                                                    269/21
6,956,657 B2    10/2005 Golini et al.

OTHER PUBLICATIONS

"Sphericity measurement using stitched interferometry", Mitutoyo Corporation, Yuichiro Yokoyama, Takeshi Hagino, Yutaka Kuriyama, 2011, Discussed in specification, English abstract included.

* cited by examiner

*Primary Examiner* — Tarifur Chowdhury
*Assistant Examiner* — Jonathon Cook
(74) *Attorney, Agent, or Firm* — Rankin, Hill & Clark LLP

(57) ABSTRACT

A partial spherical shape of each measurement area of a sphere to be measured, which is established so as to have an area overlapping with another measurement area adjacent to each other, is measured at each rotation position, and the surface shape is measured by joining the partial spherical shapes of the measurement areas by a stitching operation based on the shape of the overlapping area. The position at which the sphere is measured is changed and re-held. A positional displacement between half parts of the sphere before and after re-holding, which is caused by an effect of an error owing to the re-holding, is separated into three rotational components. Magnitudes of the three rotational components are quantified by image correlation and the positional displacement corrected. Then, the stitching operation is performed to measure the entire part of the sphere surface.

12 Claims, 19 Drawing Sheets

MEASUREMENT PROCEDURE 1

MEASUREMENT PROCEDURE 2

SPHERICAL SHAPE MEASUREMENT METHOD AND APPARATUS

CROSS-REFERENCE TO RELATED APPLICATION

The disclosure of Japanese Patent Application No. 2014-147227 filed on Jul. 17, 2014 including specifications, drawings and claims is incorporated herein by reference in its entirety.

TECHNICAL FIELD

The present invention relates to a spherical shape measurement method and apparatus, and in particular, to a spherical shape measurement method and apparatus that can measure the shape of an entire part of a sphere surface with high accuracy even in the case of re-holding the sphere.

BACKGROUND ART

Spherical parts or partly spherical parts, such as a ball of a bearing, a reference sphere used as a standard in a measurement device, and a lens are widely used in an industrial field. In order to measure the shapes of these spherical parts, a number of surface shape measurement methods and devices are proposed. An interferometer device, which is a representative example thereof, can measure the surface shapes of the spherical parts with high accuracy and high density. Furthermore, for the purpose of measuring the shape of a spherical surface that is out of a surface area measurable by the surface shape measurement device, U.S. Pat. No. 6,956,657 B2 (hereinafter called Patent Literature 1) and "sphericity measurement using stitched interferometry" proceedings of JSPE autumn meeting, 2011, p. 868-869 (hereinafter called Non-Patent Literature 1) propose an apparatus that includes surface shape measurement unit and measurement position change mechanism for holding the spherical surface to be measured and changing a measurement position.

In such an apparatus, while the measurement position change mechanism changes the measurement position by shifting the spherical surface to be measured, the surface shape measurement unit measures the shapes of a plurality of partial areas. By joining the measured shapes of the plurality of partial areas by a computation called stitching, the shape of the wide spherical surface is measured.

A summary of the spherical shape measurement apparatus described in Non-Patent Literature 1 will be explained. FIG. 1 is a side view showing the structure of the apparatus. The spherical shape measurement apparatus includes a part of a laser interferometer 20 being the surface shape measurement unit, for example, a Fizeau interferometer, and a part of a measurement position change mechanism 40 being the measurement position change mechanism. The laser interferometer 20 used in this apparatus is a device that measures the surface shape of a sphere 10 to be measured by using a reference spherical surface 22 having a spherical shape and comparing the wavelength of laser light 26 generated by a laser light source 24, which is used as a yardstick, with the reference spherical surface 22. In the drawings, a reference numeral 28 refers to a beam splitter. A reference numeral 30 refers to a collimator lens for making the laser light 26 into parallel rays. A reference numeral 32 refers to an image sensor for detecting interference light synthesized by the beam splitter 28.

The sphere 10 to be measured (hereinafter simply called sphere) is disposed in a focal point of the reference spherical surface 22. Since an area measured by the laser interferometer 20 is a part of the surface of the sphere 10 to which the laser light 26 is applied, it is required to provide means for moving the position of the laser interferometer 20 itself or the sphere 10, for the purpose of measuring a wider area. The apparatus described in Non-Patent Literature 1, which measures the shape of a sphere having a shaft, such as the sphere 10 having a support shaft 12 fixed thereto, is provided with the measurement position change mechanism 40 for moving an arbitrary surface of the sphere 10 to a measurement area of the laser interferometer 20 by a biaxial rotation mechanism having a θ rotation axis 42 and a φ rotation axis 44 orthogonal to the θ rotation axis 42, while holding the sphere 10 through the support shaft 12.

FIG. 2 is a top plan view of the apparatus according to Non-Patent Literature 1. The φ rotation axis 44 is adjusted so as to form a right angle with a measurement optical axis (perpendicular direction in the drawing of FIG. 2) and coincide with the focal point of the reference spherical surface 22 positioned thereon. By rotating the φ rotation axis 44, a bracket 46 for supporting the θ rotation axis 42 is rotated about a φ axis. The θ rotation axis 42 is rotatable thereon by 360 degrees or more. At this time, the length of the support shaft 12 and an arm of the bracket 46 is adjusted such that the center of the sphere 10 is positioned on the φ rotation axis 44, whereby the sphere 10 can be rotated by an arbitrary angle at a focus position of the reference spherical surface 22. In this structure, to measure an area extending to a half of the sphere 10 by the laser interferometer 20, the sphere 10 is rotated about the θ rotation axis 42 by 360 degrees and the φ rotation axis 44 by 90 degrees from a position at which the support shaft 12 is orthogonal to the measurement optical axis to a position at which the support shaft 12 is parallel to the measurement optical axis.

FIGS. 3A and 3B show the relation among a measurable area by the apparatus with such a configuration, and the θ and φ rotation axes of the apparatus. In FIGS. 3A and 3B, the apparatus shown in FIG. 1 viewed from above. First, the angle of the φ rotation axis 44 at which the support shaft 12 is orthogonal to the measurement optical axis of the laser interferometer 20 is defined as a first support angle φ1. FIG. 3A shows this state. Defining a central axis of the support shaft 12 as a polar axis of the sphere 10, contours in the surface of the sphere 10 at positions orthogonal to the polar axis are considered as latitude lines of the sphere 10, and the contour having a maximum diameter is the equator (a first measurement latitude line). At the first support angle φ1, rotating the θ rotation axis 42 directs an arbitrary point in the first measurement latitude line in the sphere 10 toward the laser interferometer 20. By performing measurement at the position, the shape of a single measurement area is measured at an arbitrary position of the θ rotation axis 42. It is desirable that rotation intervals of the θ rotation axis 42 be determined so as to have an overlapping area between the single measurement areas adjacent to each other, for the sake of a switching operation performed afterward. This overlapping area may be approximately of the order of a half of a viewing angle of the laser interferometer 20, for example. Here, the first support angle φ1 is defined as a position at which the support shaft 12 is orthogonal to the measurement optical axis, but is not necessarily such a position and may be set at any arbitrary position.

Then, the φ rotation axis 44 is rotated to set the support shaft 12 at a position different from the first support angle φ1. This position is referred to as a second support angle φ2. FIG. 3B shows this state. By rotating the θ rotation axis 42 at this position, points on the spherical surface intersecting with the measurement optical axis of the laser interferometer 20 draw a trail. A contour line represented by this trail is referred to as a second measurement latitude line. Just as with an operation at the first support angle φ1, rotating the θ rotation axis 42 allows measurement of the shape of the single measurement area at an arbitrary position of the θ rotation axis 42 in the second measurement latitude line in the spherical surface. Just as with the rotation intervals of the θ rotation axis 42, the distance between the first support angle φ1 and the second support angle φ2 may be approximately of the order of a half of the viewing angle of the laser interferometer 20, for example.

A plurality of support angles φ are set in a rotation range of the φ rotation axis 44, and the θ rotation axis 42 is operated at each position. This procedure is performed until the single measurement areas corresponding to the individual positions cover a half part of the sphere 10. The shapes of a number of the single measurement areas obtained in this manner are stitched together by the stitching operation with reference to positional information of the θ rotation axis 42 and the φ rotation axis 44, to measure the surface shape of the sphere 10. The rotation range of the φ rotation axis 44 is not limited to 90 degrees as shown in FIG. 2, and can be set in an arbitrary range as long as there is no physical contact between the laser interferometer 20 and the measurement position change mechanism 40, or the like. A necessary prerequisite for the plurality of single measurement areas covering the half of the sphere 10 is a rotation range of 90 degrees of the φ rotation axis 44.

When the measurement position change mechanism 40 has a dimensional error, that is, each constituting part has a dimension different from a design value, or a movement error, the sphere 10 may be displaced from the focus position of the reference spherical surface 22 with rotation of the θ rotation axis 42 and the φ rotation axis 44. In the interferometer device for measuring the spherical surface, this positional displacement causes a measurement error. Accordingly, the apparatus of Non-Patent Literature 1 may be provided with, for example, three axes movement mechanism 46 having stages 48x, 48y, and 48z, as shown in FIG. 4. This positional displacement can he corrected by moving the sphere 10 with reference to an interference fringe image of the laser interferometer 20 so as to minimize the number of interference fringes.

SUMMARY OF INVENTION

Technical Problem

The conventional techniques described in Patent Literature 1 and Non-Patent Literature 1 measure a partly spherical shape such as a lens or a sphere held by a fixed shaft. Thus, an area around the shaft and an area around a held portion are difficult to measure, and a measurement range of the conventional techniques is limited to approximately a half part of the sphere at the most. An area beyond the half part of the sphere can be measured, depending on the size of a field of view of the laser interferometer or a movement, range of the measurement position change mechanism, but it is still impossible to measure the held portion of the sphere. Therefore, it is desirable to provide an apparatus and a measurement method for measuring the shape of the entire sphere (surface) with high accuracy.

Thus, like a reference example shown in FIG. 5, it is conceivable that the apparatus of the Non-Patent Literature 1, which includes the laser interferometer 20 and the measurement position change mechanism 40 having the θ rotation axis 42, the φ rotation axis 44, and the bracket 46, is newly provided with means for changing the position at which the sphere is held, the means comprising a sphere holding mechanism 50, a sphere support table 52, a lift axis 54 in Z direction, a base 56 for supporting the sphere support table 52, and an adjustment axis 60 in R direction, in order to enable re-holding of the sphere and measurement of the shape of the entire sphere.

Solution to Problem

To solve the above-described problem, a spherical shape measurement method according to the present invention for measuring a surface shape include: freely rotating a sphere to be measured; measuring a partial spherical shape of each measurement area, which is established so as to have an area overlapping with another measurement area adjacent to each other, at each rotation position; and joining the partial spherical shapes of the measurement areas by a stitching operation based on a shape of the overlapping area, thereby measuring the surface shape. The method further includes the step of enabling a sphere support table to hold the sphere in a state of detaching the sphere from a sphere hold mechanism to which the sphere is freely attachable and detachable, and the step of changing a position at which she sphere is held, so that the entire part of the sphere surface can be measured.

The sphere support table may be rotatable.

The positions of the sphere and surface shape measurement unit may be adjustable.

A procedure for measurement of an entire sphere will hereinafter be described with reference to FIG. 6.

First, the sphere 10 is attracted to the sphere bold mechanism 50 in step 100. The φ rotation axis 44 is rotated and set at a predetermined angle in step 110. Then, the rotation of the θ rotation axis 42 in step 120 and the measurement of the single measurement area in step 130 are repeated, until it is judged in step 140 that measurement covering an entire predetermined latitude line, has been performed.

Then, the φ rotation axis 44 is rotated in step 110 to change the latitude line and a repetition of steps 120 to 140 is performed, until it is judged in step 150 that measurement covering a half part of the sphere (surface) has been performed.

When it is judged that the measurement of the first half part of the sphere has been completed in step 150, the sphere 10 is re-held in step 160. More specifically, as shown in FIG. 7, the lift axis 54 in S direction is moved up while the sphere hold mechanism 50 is attracting the sphere 10, so that the sphere support table 52 comes into contact with the sphere 10 (step 162). Then, the sphere 10 is detached from the sphere hold mechanism 50, and supported by the sphere support table 52 (step 164). Then, the sphere hold mechanism 50 is retracted (moved backward in a right direction of the drawing) by operation of the adjustment axis 60 in R direction to keep the sphere hold mechanism 50 from contact with the sphere 10 (step 166). In this state, the measurement position change mechanism 40 can move to an arbitrary rotation position by the rotation of the φ rotation axis 44 (step S163). After the rotation position is changed, the adjustment axis 60 in R direction is operated (moved forward in a left direction of the drawing), so that the sphere hold mechanism 50 makes tight contact with the sphere 10 (step 170), and the sphere hold mechanism 50 attracts the sphere 10 again (step 172). After that, the lift axis 54 in Z direction is operated to move down the sphere support table 52 (step 174).

This sequential operation changes the position of holding the sphere 10, and allows the re-holding of the sphere 10. To be more specific, by 180 degrees rotation of the φ rotation axis 44 from a position shown in FIG. 2 at which the θ rotation axis 42 is orthogonal to the measurement optical axis, the sphere 10 is re-held at a position inverted by 180 degrees.

After the re-holding, a second half part of the sphere (surface) is measured at steps 210 to 250, corresponding to steps 110 to 150. By doing so, measurement is performed in the state of directing a portion that the sphere has been held by and cannot be measured by the apparatus described in Non-Patent Literature 1 toward the laser interferometer 20, and it becomes possible to collect measurement results of the single measurement areas that cover the entire sphere. Provided that the first half part of the sphere is measured before the re-holding and the second half part of the sphere is measured after the re-holding, the shape of the entire sphere can be measured by the stitching operation of the two half parts of the sphere in step 300. An operation flow to measure each of the first and second half parts of the sphere is the same as that of Non-Patent Literature 1. The sphere 10 is re-held between the measurement of the two half parts of the sphere, and the stitching operation is performed to join the two half parts of the sphere after the measurement.

The rotation range of the φ rotation axis 44 in a re-holding operation of the sphere 10 is not limited to 180 degrees, and an arbitrary angle is adoptable. However, the most efficient way to measure the shape of the entire sphere is that the sphere 10 is re-held at a position of 180 degrees and measured half by half.

However, an the measurement procedure using the reference example, since the re-holding of the sphere once separates the measurement position change mechanism 40 from the sphere 10, continuity before and after the re-holding between at the position of the single measurement area in the spherical surface and at the position of each of the θ rotation axis 42 and the φ rotation axis 44 is lost. For this reason, the sphere 10 has to be re-held with as much care as possible to prevent, the occurrence of an error such as a positional displacement. When there is an eccentricity of the support shaft 12 or a mechanical error of the φ rotation axis 44 owing to whirling or the like, the center of the rotation of the measurement position change mechanism 40 does not necessarily coincide with the center of the sphere 10, and hence an error owing to the re-holding may possibly occur.

It is conceivable to reduce the error owing to the re-holding by adding a sphere re-holding mechanism having a rotation axis for making the sphere support table 52 rotatable, for example. However, even with the use of such a structure, the error owing to the re-holding may possibly occur if there is an eccentricity of the added rotation axis, a difference in dimension of a component of the apparatus from a design value, or insufficient adjustment. Accordingly, the possibility of occurrence of the error owing to the re-holding of the sphere is still not completely eliminated.

For this reason, it is desirable to provide a calculation method that reduces an effect of such an error owing to the re-holding of a sphere and joins measurement results with high accuracy.

The present invention has been made in order to solve the above-described problem in the conventional technique, and an object thereof is to enable measurement of the shape of an entire part of a sphere surface with high accuracy with a reduced effect of an error owing to re-holding of the sphere.

To solve the above-described problem, a spherical shape measurement method according to the present invention for measuring a surface shape includes: freely rotating a sphere to be measured; measuring a partial spherical shape of each measurement area, which is established so as to have an area overlapping with another measurement area adjacent to each other, at each rotation position; and joining the partial spherical shapes of the measurement areas by a stitching operation based on a shape of the overlapping area thereby measuring the surface shape. The method further includes the step of enabling the sphere to be re-held at a different position, and the step of separating a positional displacement between half parts of the sphere before and after re-holding, which is caused by an effect of an error owing to the re-holding of the sphere, into three rotational components, performing quantification of magnitudes of the three rotational components by image correlation, correcting the positional displacement, and thereafter performing the stitching operation to measure the entire part of the sphere surface.

Here, the image correlation may be image correlation of only translation.

The three rotational components may be displacements about three axes including a polar axis of the half part of the sphere before and after the re-holding, respectively.

The image correlation may include image correlation for correcting rotation.

The present invention provides a spherical shape measurement apparatus that includes surface shape measurement unit for measuring the partial shape of a spherical surface, and measurement position change mechanism for freely rotating a sphere to be measured relative to the surface shape measurement unit. The spherical shape measurement apparatus measures the partial spherical shape of each measurement area, which is established so as to have an area overlapping with another measurement area adjacent to each other, at each rotation position, and the surface shape is measured by joining the partial spherical shapes of the measurement areas by a stitching operation based on the shape of the overlapping area. The spherical shape measurement apparatus further includes: a sphere hold mechanism to which the sphere is freely attachable and detachable; a sphere support table for holding the sphere detached from the sphere hold mechanism; a controller for changing a position at which the sphere is re held; and a computer for separating a positional displacement between half parts of the sphere before and after re-holding, which is caused by an effect of an error owing to the re-holding of the sphere, into three rotational components, performing quantification of magnitudes of the three rotational components by image correlation, correcting the positional displacement, and thereafter performing the stitching operation to measure the entire part of the sphere surface.

The surface shape measurement unit may be a laser interferometer, and the measurement position change mechanism may rotate the sphere about a first rotation axis and a second rotation axis orthogonal to the rotation axis.

The sphere support table may have a recess at a top surface thereof to receive and support the sphere detached from the sphere hold mechanism therein.

The spherical shape measurement apparatus may further include a mechanism for moving up and down the sphere support table.

The spherical shape measurement apparatus may further include a mechanism for retracting the sphere hold mechanism, while the sphere is detached.

The spherical shape measurement apparatus may further include a mechanism for rotating the sphere support table.

A rotation axis of the mechanism for rotating the sphere support table and the second rotation axis of the measurement position change mechanism may be coaxial with each other.

The spherical shape measurement apparatus may further include a movement mechanism in three axes directions to adjust the relative position between the sphere and the surface shape measurement unit.

According to the present invention, it becomes possible to measure the entire part of the sphere surface with high accuracy with the reduced effect of the error owing to she re-holding of the sphere.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described below in detail with reference to the drawings.

Note that, the present invention is not limited to descriptions of the below embodiments and practical examples. Components of the below embodiments and practical examples include what is easily assumed by those skilled in the art, what is substantially the same, and what is in a so-called equivalent scope. Moreover, the components described in the below embodiments and practical examples may be appropriately combined or appropriately selectively used.

Figure 5:
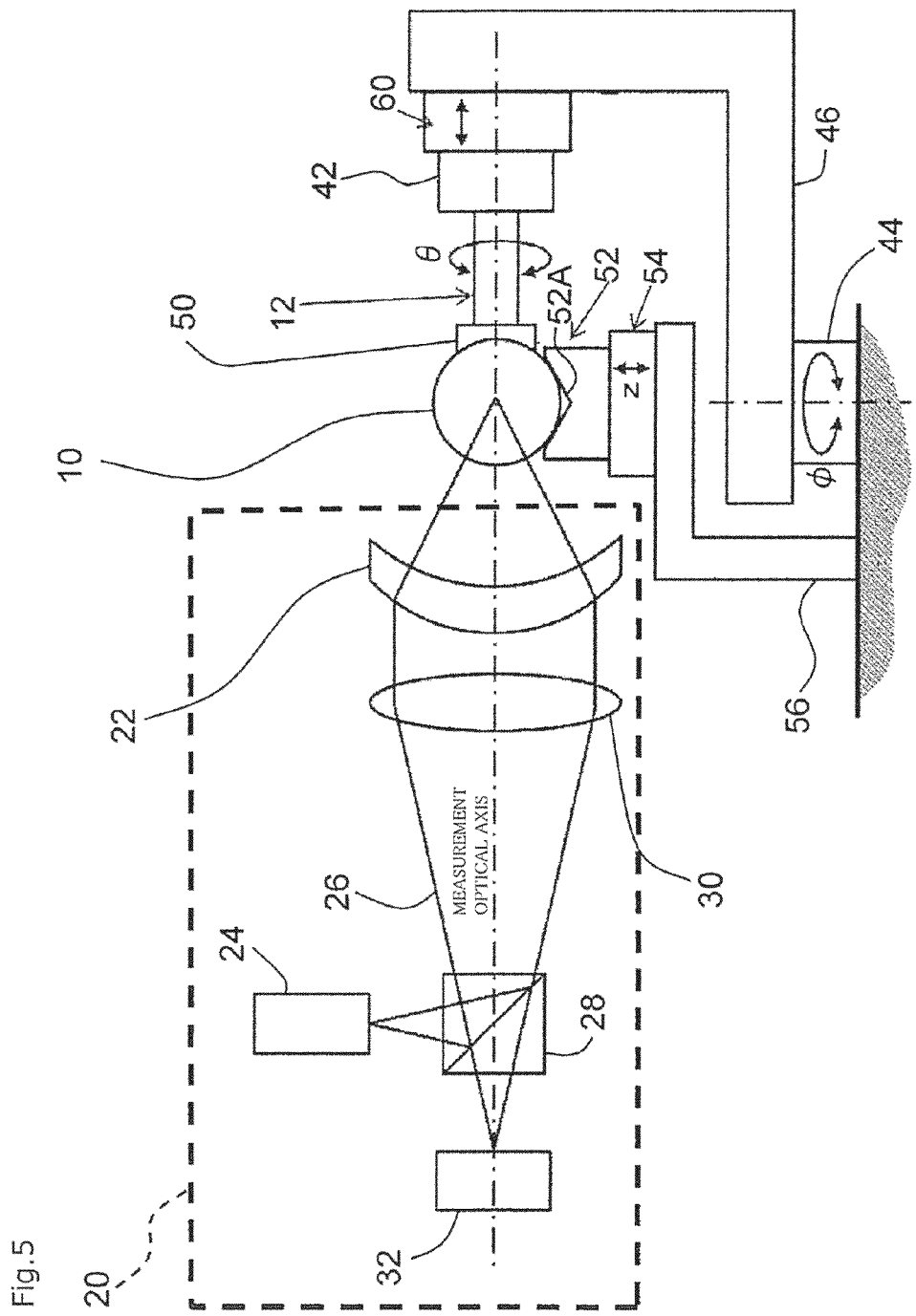
FIG. 5 is a side view of a reference example in which improvement is made to the apparatus of FIG. 1.
Figure 8:
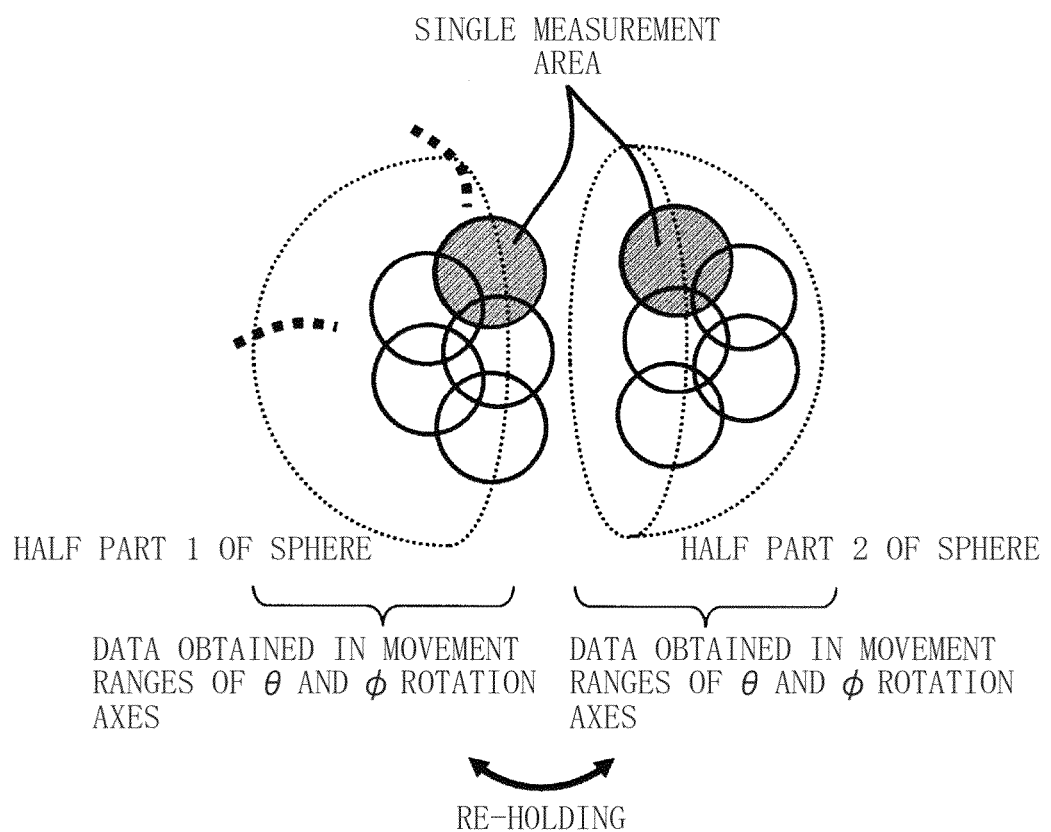
FIG. 8 is a schematic view showing groups of measurement results in the case of re-holding the sphere, for the sake of explaining the principle of the present invention.

In the reference example shown in FIG. 5, groups of measurement results are obtained as collectives of single measurement areas as shown in FIG. 8. A half part 1 of a sphere and a half part 2 of the sphere show the groups of the measurement results before and after the re-holding of a sphere obtained in movement ranges of the $\theta$ rotation axis 42 and the $\phi$ rotation axis 44. In each group of the measurement results, the single measurement areas of a size corresponding to a measurement viewing angle of the surface shape measurement unit are arranged so as to cover the entire half part of the sphere surface, and the adjoining single measurement areas are disposed so as to have an area overlapping with each other.

Figure 9:
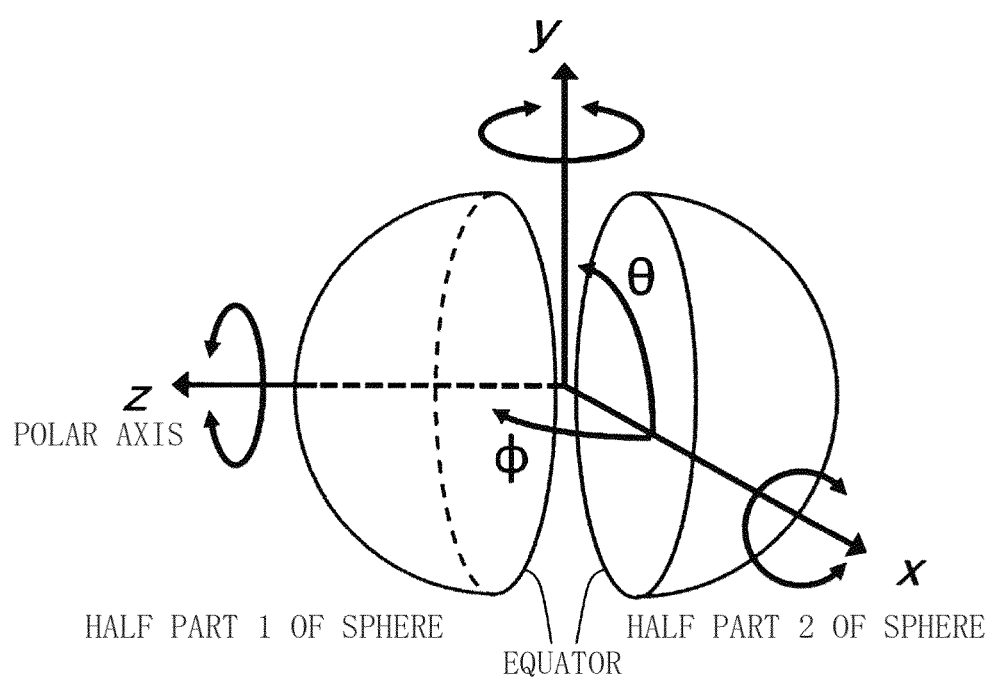
FIG. 9 is a schematic view showing a measurement coordinate system, for the same sake.

A coordinate system for dealing with the measurement results is defined as shown in FIG. 9. The coordinate system is established such that the two half parts of the sphere are symmetrically with respect to an XY plane. "$\theta$" represents an angle in the XY plane, and "$\phi$" represents an angle from the XY plane toward a Z axis in which a direction from the XY plane toward the Z axis is assigned as positive. If the Z axis is a polar axis of the sphere 10, a contour in the spherical surface at such a position that $\phi$ is 0 represents the shape of the equator. In the above-described measurement, it is required to obtain measurement values of the half part 1 of the sphere and the half part 2 of the sphere in at least the same latitude line. In fact, in measurement of any half part of the sphere, it is desirable to obtain measurement values in the equator. By comparison between measurement results in the same latitude line, a positional displacement owing to an error of the re holding is obtained.

It will be discussed that how an error in a re-holding operation of a sphere has an effect on the measurement results of the two half parts of the sphere in the apparatus according to the reference example. The positional relationship among the single measurement areas contained in each half part of the sphere is determined by movement of the $\theta$ rotation axis 42 and the $\phi$ rotation axis 44, and has no positional displacement, ideally. Thus, the collective of the measurement areas of each half part of the sphere is considered as the group, and it will be considered that how the two groups have a positional displacement. Here, in measurement of each individual single measurement area, the sphere 10 is aligned as precisely as possible relative to the surface shape measurement unit to make a displacement of the group of the measurement results relative to the coordinate system in three axes direction negligible small. For this reason, an effect of the error owing to the re-holding operation of a sphere is integrated into a displacement by rotation about each of X, Y, and Z axes in the coordinate system in the drawing. Accordingly, the correction of positional displacements can be achieved by detecting displacements of the rotation and correcting the same.

Figure 10:
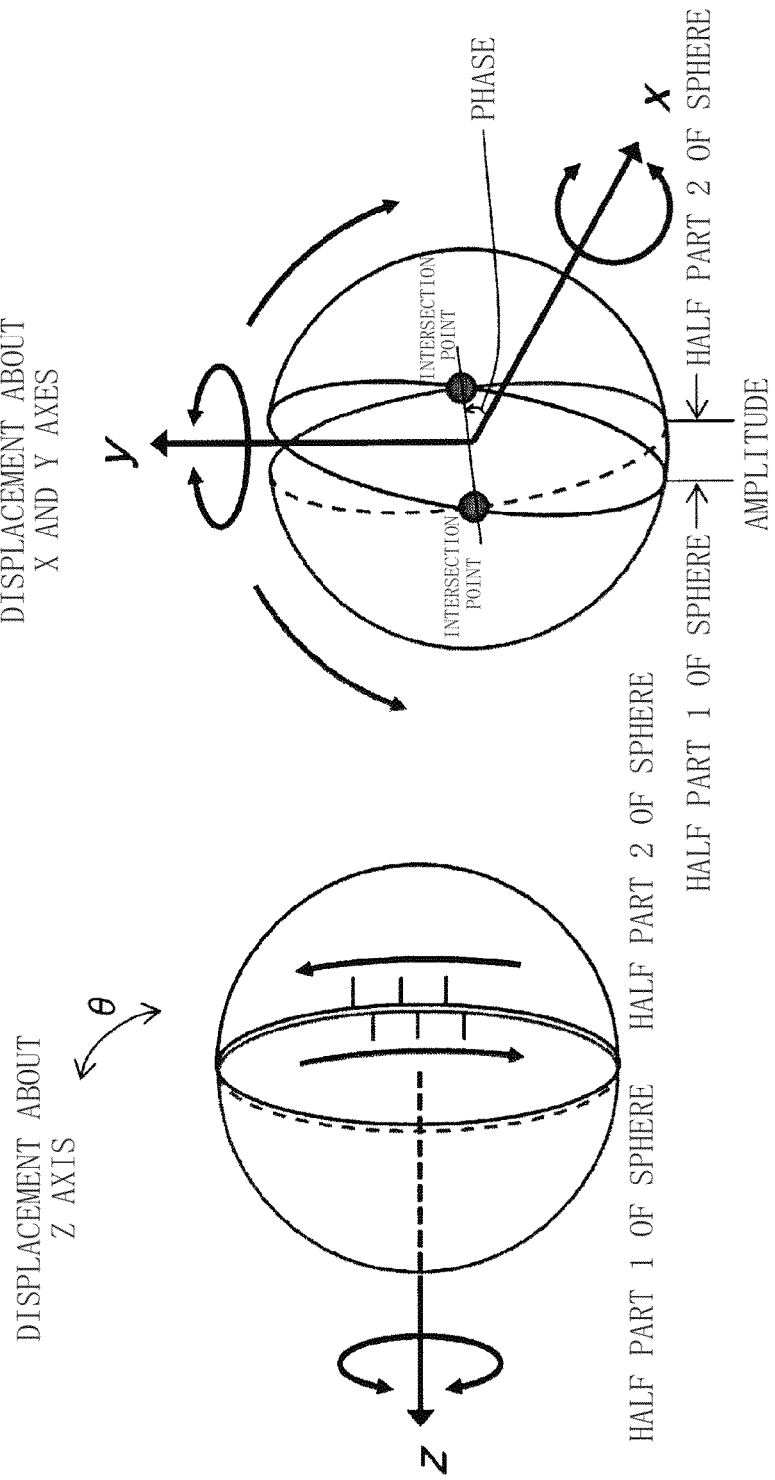
FIG. 10A is a schematic view showing an effect of a displacement owing to rotation about a Z axis, for the same sake.
FIG. 10B is a schematic view showing an effect of a displacement owing so rotation about an X axis and a Y axis, for the same sake.
Figure 11:
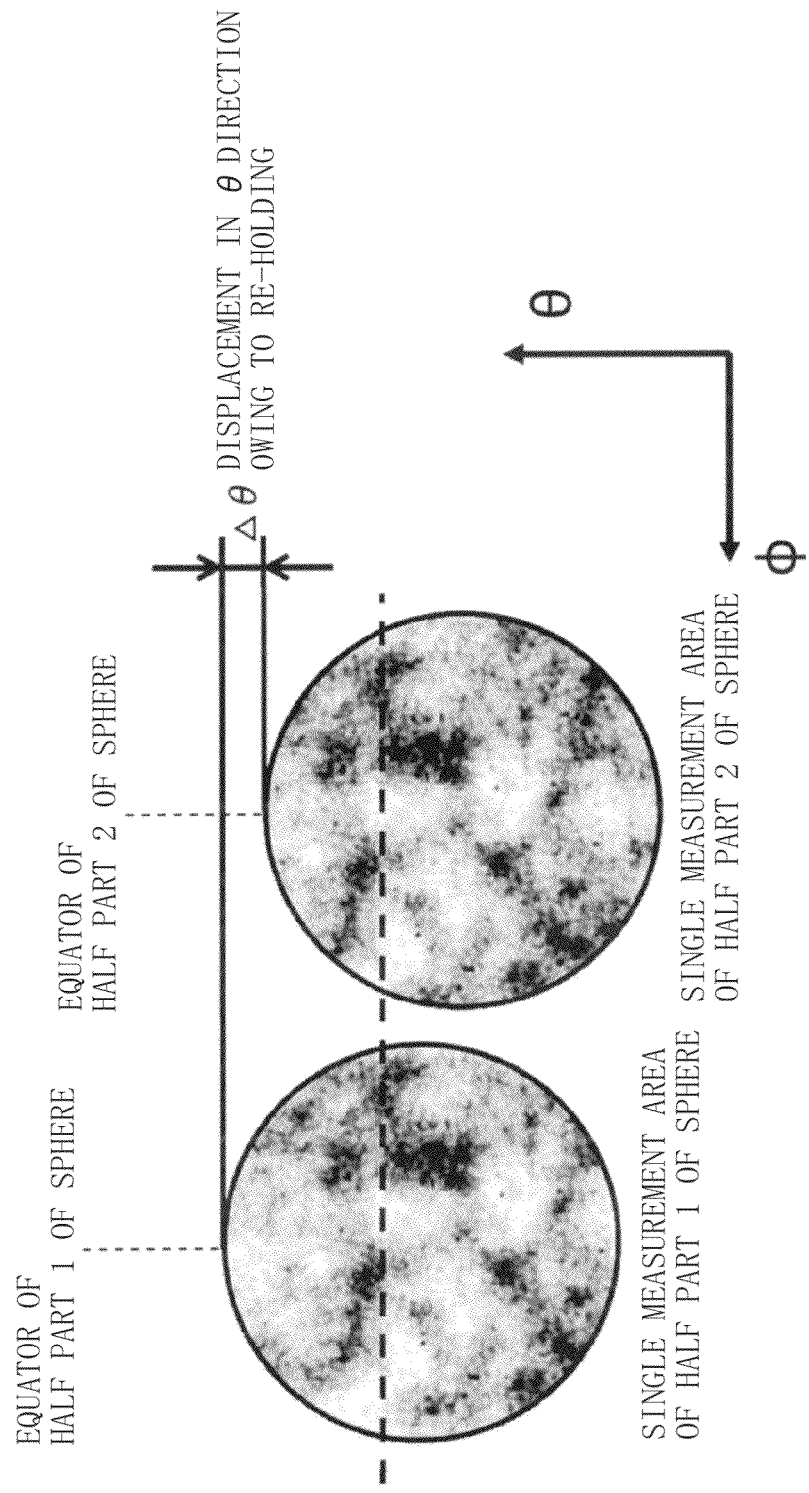
FIG. 11 is a diagram showing measurement results of single areas in a case where the rotational displacement occurs about the Z axis, for the same sake.
Figure 12:
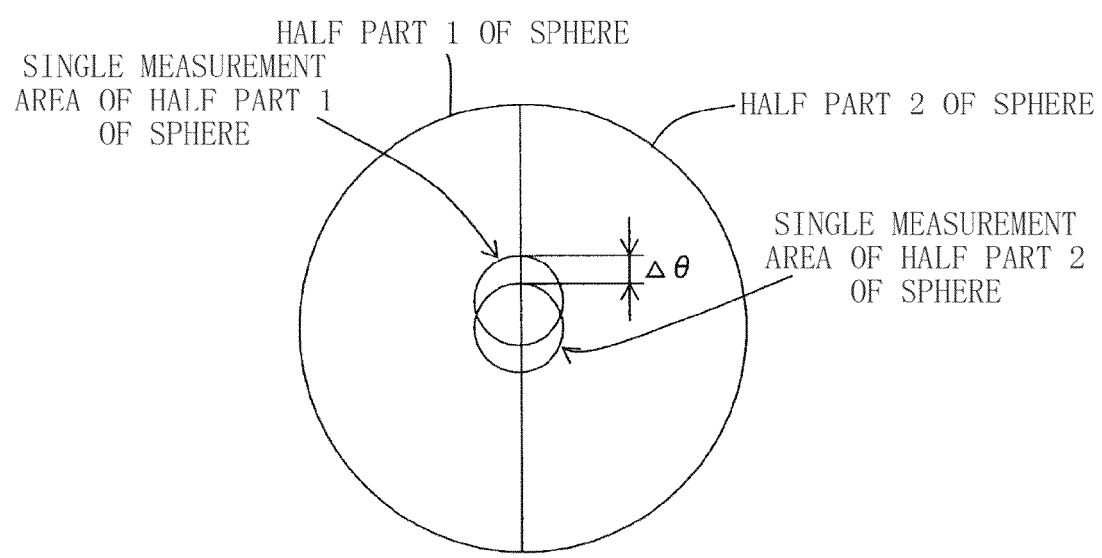
FIG. 12 is a schematic view showing the state of occurrence of the displacement, for the same sake.

When a rotational displacement occurs about the Z axis, as shown in FIG. 10A, the half part 1 of the sphere and the half part 2 of the sphere are displaced in a $\theta$ direction. In order to estimate the magnitude of this displacement, the single measurement areas of the half part 1 of the sphere and the half part 2 of the sphere for measuring the same position in measurement of each of the half part 1 of the sphere and the half part 2 of the sphere are compared with each other. FIG. 11 shows an example of measurement results of the single measurement areas. Two images of FIG. 11 correspond to two images in the same position of the $\theta$ rotation axis 42 and the $\phi$ rotation axis 44 in the measurement of each of the half part 1 of the sphere and the half part 2 of the sphere as shown in FIG. 12, and are disposed side by side with being displaced in a φ direction for purpose of illustration. A displacement amount between the two images represents a displacement Δθ between the two half parts of the sphere in the θ direction. As a method for detecting the relative positional difference between such two images, a method by image correlation is known. A simple method for dealing with the image correlation is represented as follows:

When $g_1(x, y)$ and $g_2(x,y)$ refer to signals representing the two images, $G_1(f_x,f_y)$ and $G_2(f_x,f_y)$ refer to Fourier transformation thereof. A cross-correlation function $r_{12}(\tau_x,\tau_y)$ of the two images is obtained by performing inverse Fourier transformation of a cross power spectrum $R_{12}(f_x,f_y)$ of the Fourier transformation of the two images.

[Expression 1]

$$R_{12}(f_x,f_y)=G_1(f_x,f_y)\cdot G_2^*(f_x,f_y) \quad (1)$$

$$r_{12}(\tau_x,\tau_y)=\iint R_{12}(f_x,f_y)\exp[2\pi i(f_x\tau_x+f_y\tau_y)]df_xdf_y \quad (2)$$

Figure 13:
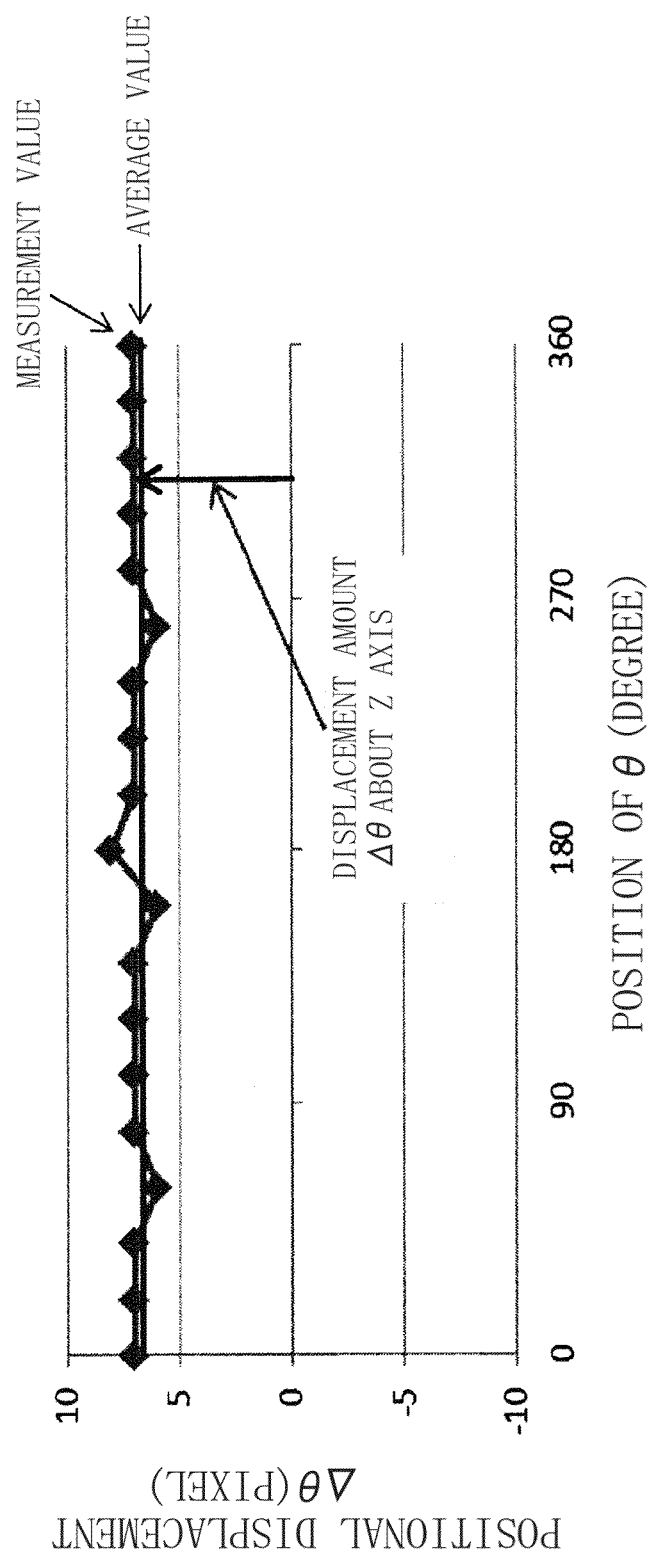
FIG. 13 is a drawing showing art example of a calculation value of the rotational displacement, for the same sake.

A peak position of the cross-correlation function represents a displacement amount between the two images, and the value thereof is obtained as a pixel number. Here, $\tau_y$ represents the displacement amount in the θ direction. In fact, as shown in FIG. 13, comparison of each of a plurality of measurement values (18 points in FIG. 13) of the half part 1 of the sphere and the half part 2 of the sphere in the same latitude line by the image correlation allows detecting an approximately constant positional displacement (7 pixels in FIG. 13), and therefore an average value thereof is determined as the magnitude of the rotational displacement about the Z axis. Since the pixel number representing the displacement amount can be converted into an angle on the basis of the relation between the viewing angle of the surface shape measurement unit and the pixel number, the rotational displacement about the Z axis is corrected on the basis of the calculated angle by coordinate transformation.

Figure 14:
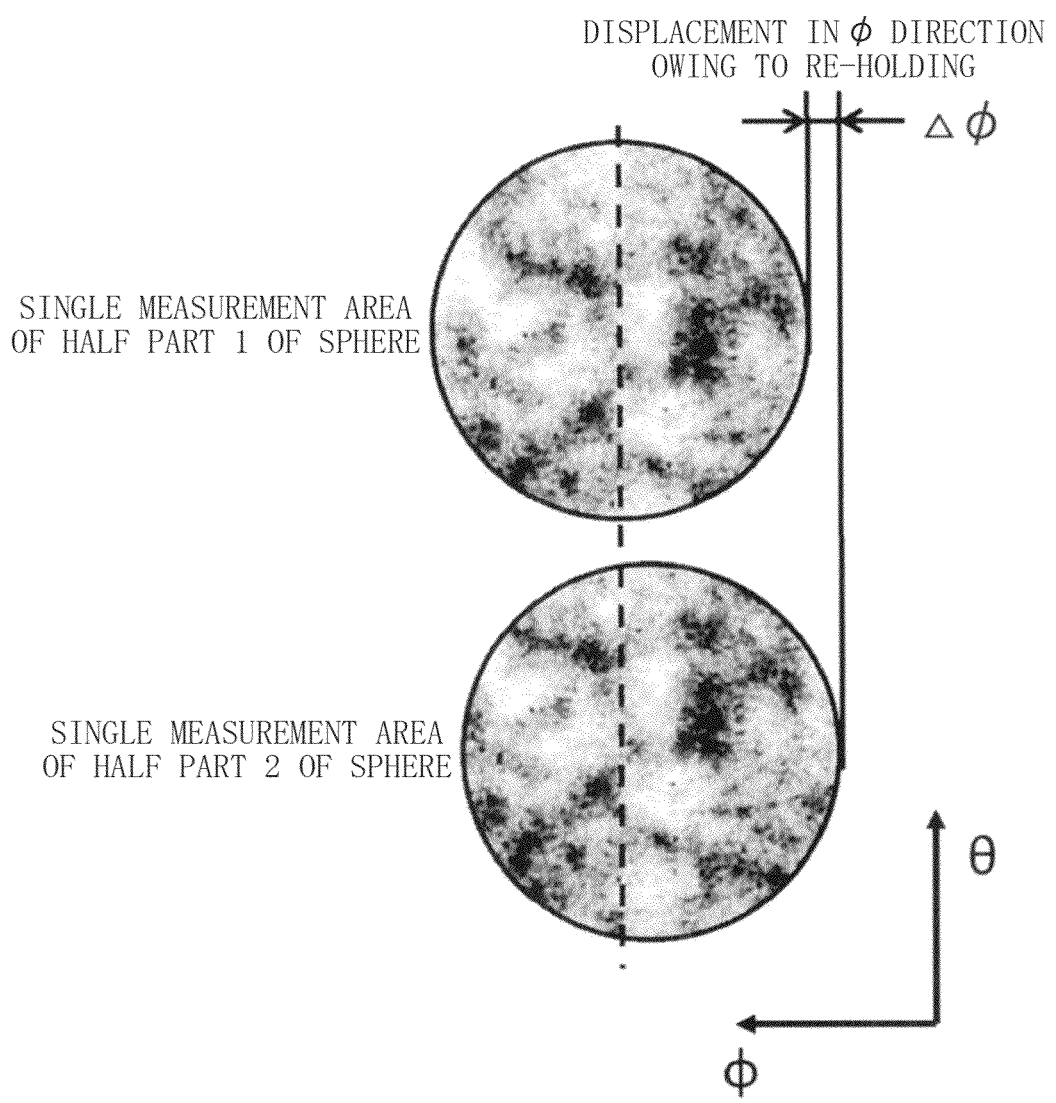
FIG. 14 is a drawing showing measurement results of single areas in a case where the rotational displacement occurs about the X axis and the Y axis, for the same sake.
Figure 15:
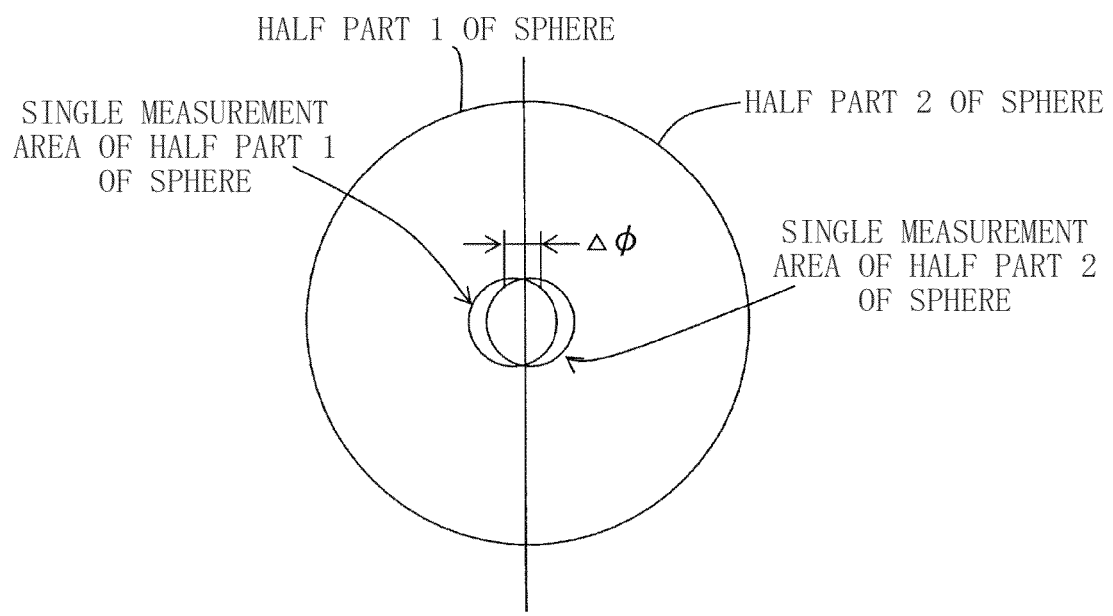
FIG. 15 is a schematic view showing the state of occurrence of the displacement, for the same sake.
Figure 16:
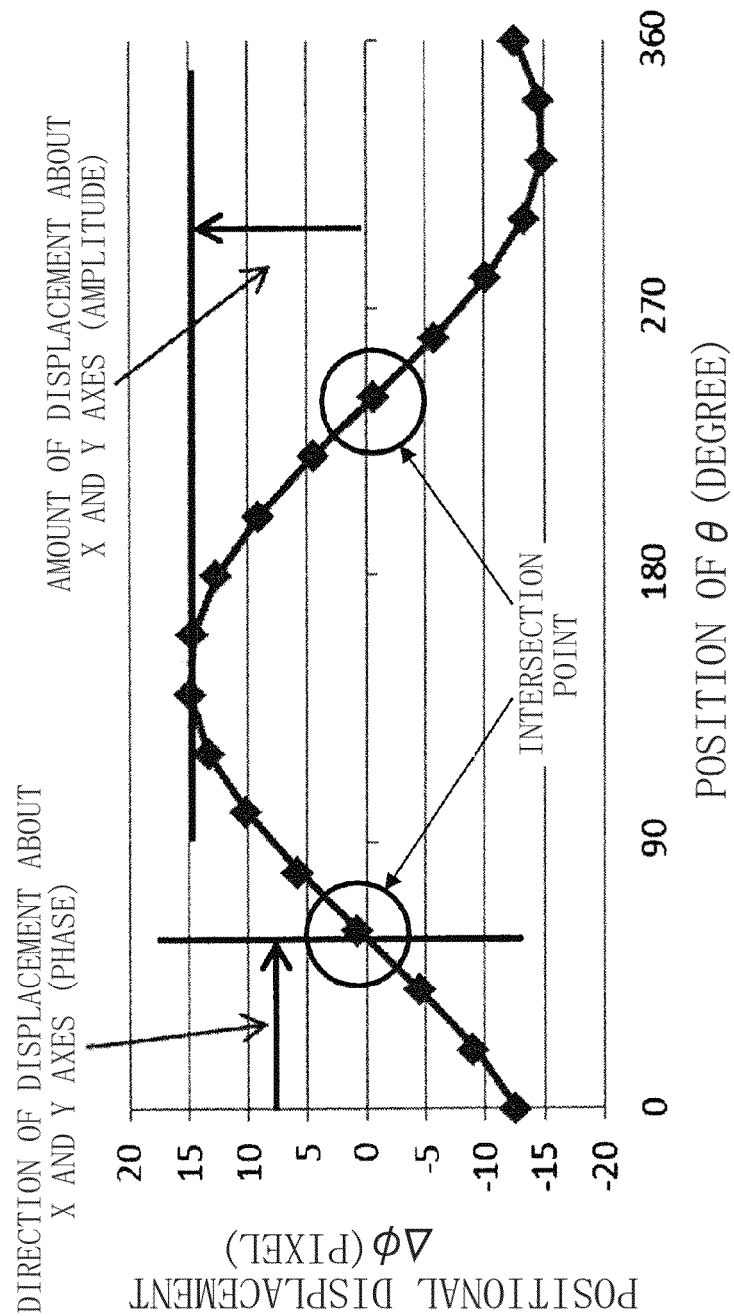
FIG. 16 is a drawing showing an example of a calculation value of the rotational displacement, for the same sake.

Next, it will be considered a case in which a rotational displacement occurs about the X axis and the Y axis. A rotational displacement about the X axis and a rotational displacement about the Y axis are equivalent in the coordinate system of FIG. 9, except for direction, and hence these two displacements can be treated as a single displacement amount. When this displacement occurs, as shown in FIG. 10B, the half part 1 of the sphere and the half part 2 of the sphere are displaced such that the latitude lines of the half part 1 of the sphere and the half part 2 of the sphere in the equal position intersect with each other at two points. In order to estimate the magnitude of this displacement, the single measurement areas of the half part 1 of the sphere and the half part 2 of the sphere for measuring the same position in measurement of each of the half part 1 of the sphere and the half part 2 of the sphere are compared with each other. FIG. 14 shows an example of measurement results of the single measurement areas. These two images correspond to two images in the same position of the θ rotation axis 42 and the φ rotation axis 44 in the measurement of each of the half part 1 of the sphere and the half part 2 of the sphere, as shown in FIG. 15, and are disposed side by side with being displaced in the θ direction for purpose of illustration. A displacement amount of the two images represents a displacement in the φ direction between the two half parts of the sphere in a certain position of θ. The displacement amount varies in a sinusoidal fashion depending on the position of θ. Here, a displacement amount $\tau_x$ in the φ direction is calculated from an image correlation function represented by the expression (2). By comparing each of a plurality of measurement values of the half part 1 of the sphere and the half part 2 of the sphere in the same latitude line by the image correlation and plotting a track of $\tau_x$ in accordance with the position of θ, a sine wave as shown in FIG. 16 is obtained. The amplitude of the sine wave represents the magnitude of she displacement about the X axis and the Y axis, and the phase thereof represents direction of the displacement. Based on these values, the rotational displacements about the X axis and the Y axis are corrected by coordinate transformation.

Figure 17:
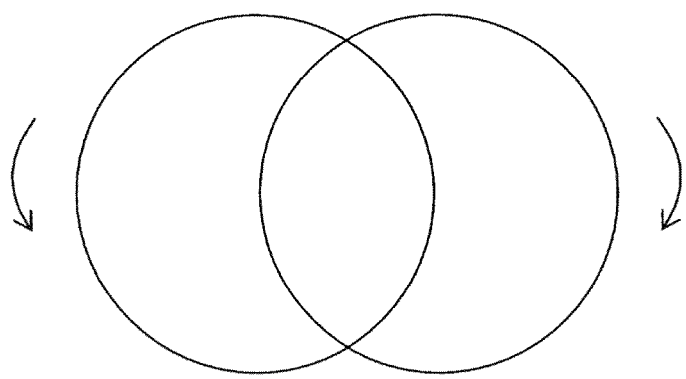
FIG. 17 is a schematic view that explains image correlation for correcting the rotation, for the same sake.

Note that, when two images disposed near intersecting points in FIG. 16 are compared, there is displacement in rotational direction of each image. In such a case, image correlation dealing with only translation as described above can not compute amount of displacement correctly, and large displacement from the sine wave may be computed. In such a case, image correlation for correcting rotation may be added as shown in FIG. 17.

Figure 18:
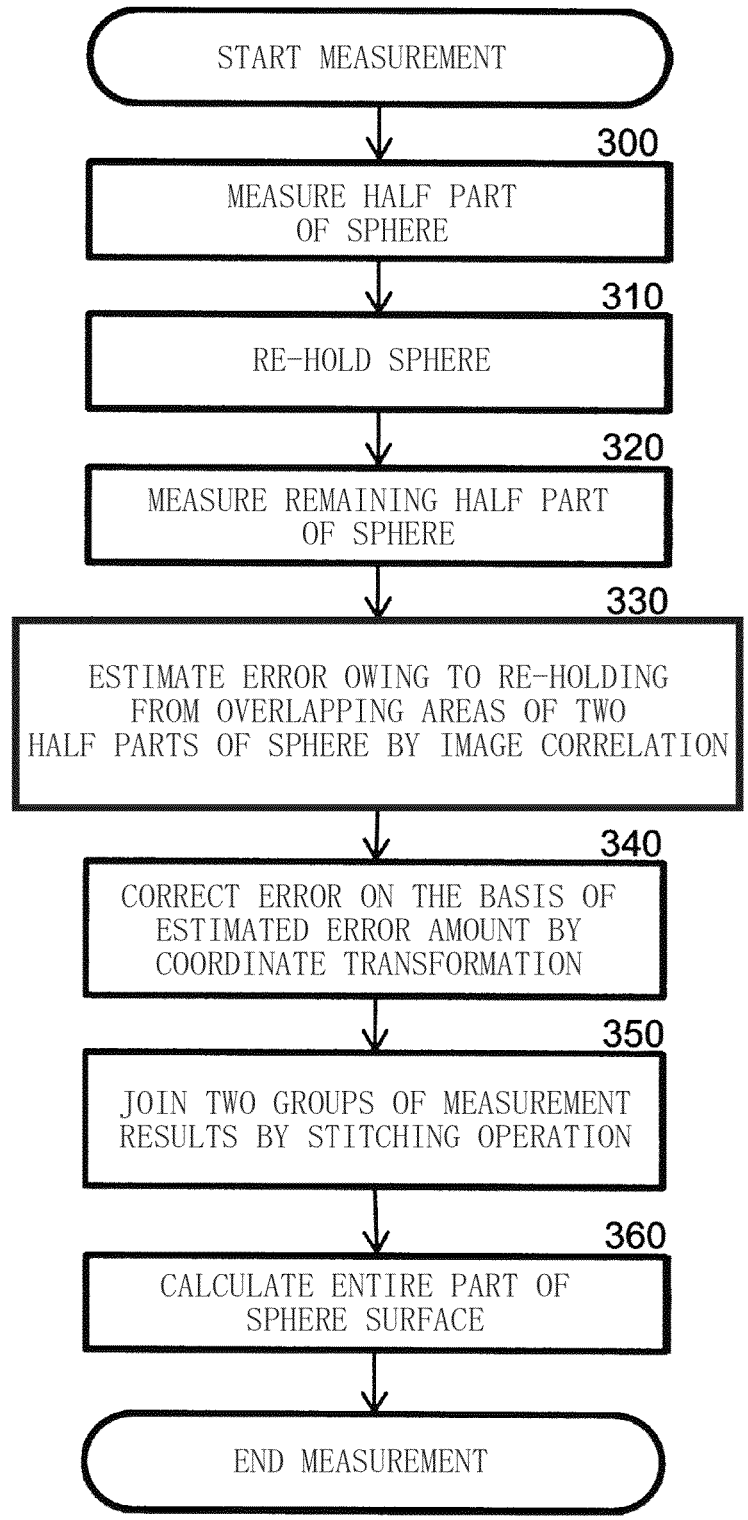
FIG. 18 is a flowchart of an example of a measurement procedure according to the present invention.

According to the above procedure, when there is an error in the re-holding of a sphere, it is possible to reduce the effect of the positional displacement occurring in the measurement results of two half parts of the sphere. Joining the measurement results of the half part 1 of the sphere and the half part 2 of the sphere after correction of the positional displacement by the stitching operation allows measurement of the entire part of the sphere surface with high accuracy. FIG. 18 shows a flowchart of a measurement procedure.

Figure 6:
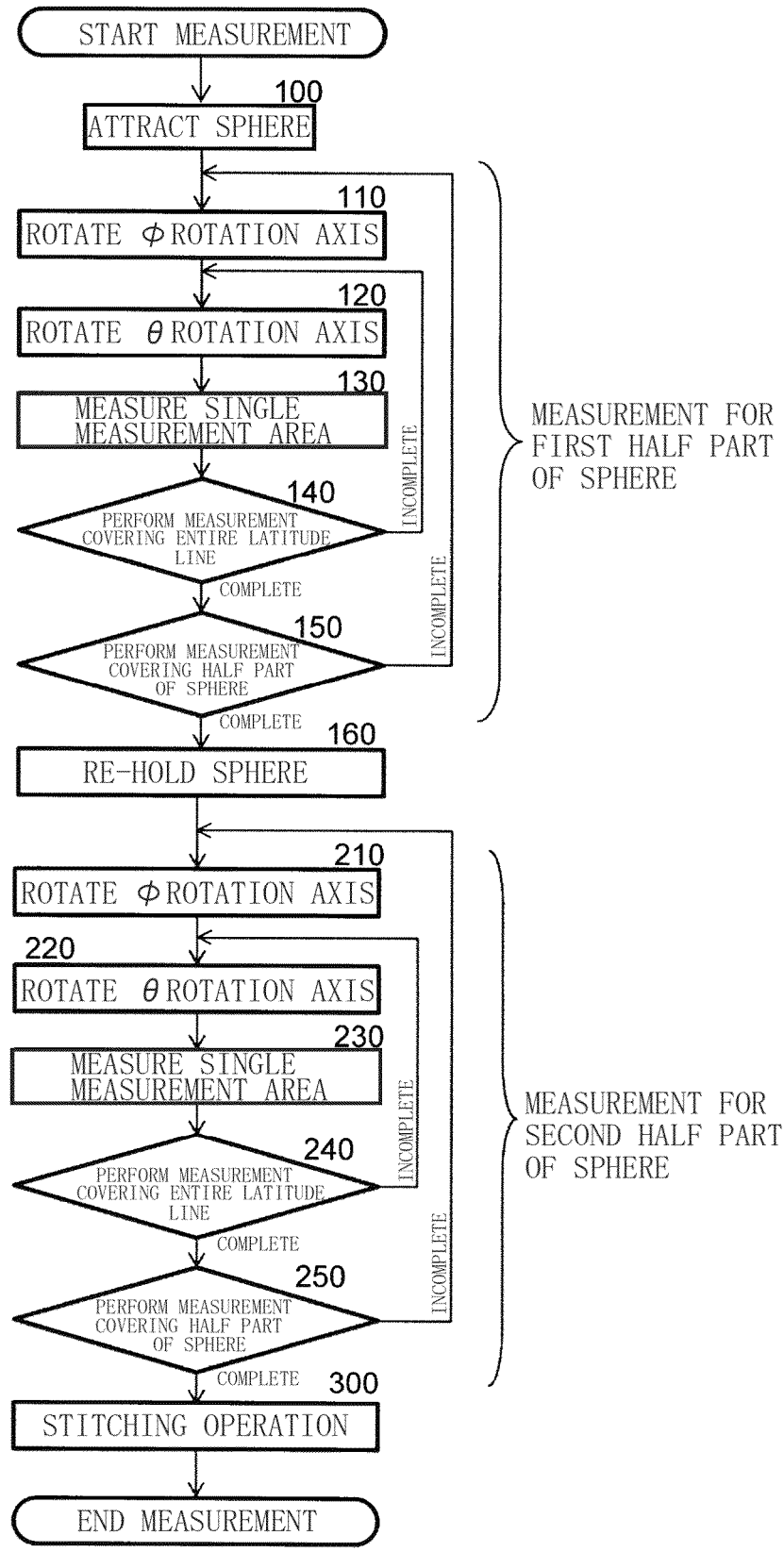
FIG. 6 is a flowchart of a procedure for measuring the entire part of a sphere surface in the reference example.
Figure 7:
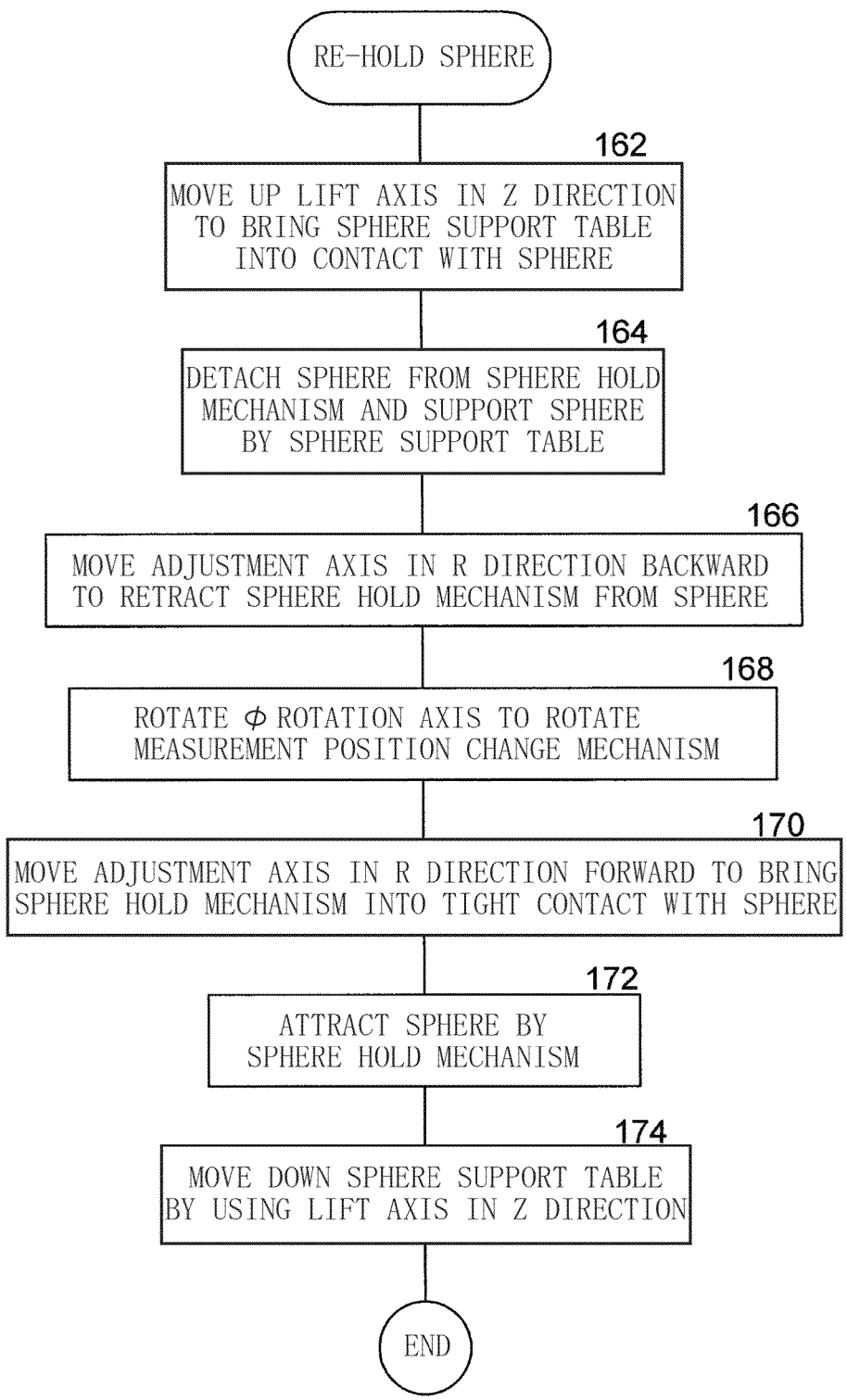
FIG. 7 is a flowchart of a procedure for re-holding the sphere in the reference example.

First, a first half part of a sphere is measured in step 300 in the same manner as those in steps 100 to 150 of FIG. 6. The sphere is re-held in step 310, just as with step 160 of FIG. 6, by the same steps as shown in FIG. 7. Then, a remaining second half part of the sphere is measured in step 320 in the same manner as those in steps 210 to 250 of FIG. 6.

Then, an error owing to the re-holding is estimated by the image correlation in step 330 from overlapping areas of the two half parts of the sphere. Based on an estimated error amount, the error is corrected in step 340 by the coordinate transformation.

Then, the stitching operation is performed in step 250 to join two groups of measurement results, and the entire part of the sphere surface is calculated in step 360.

Figure 19:
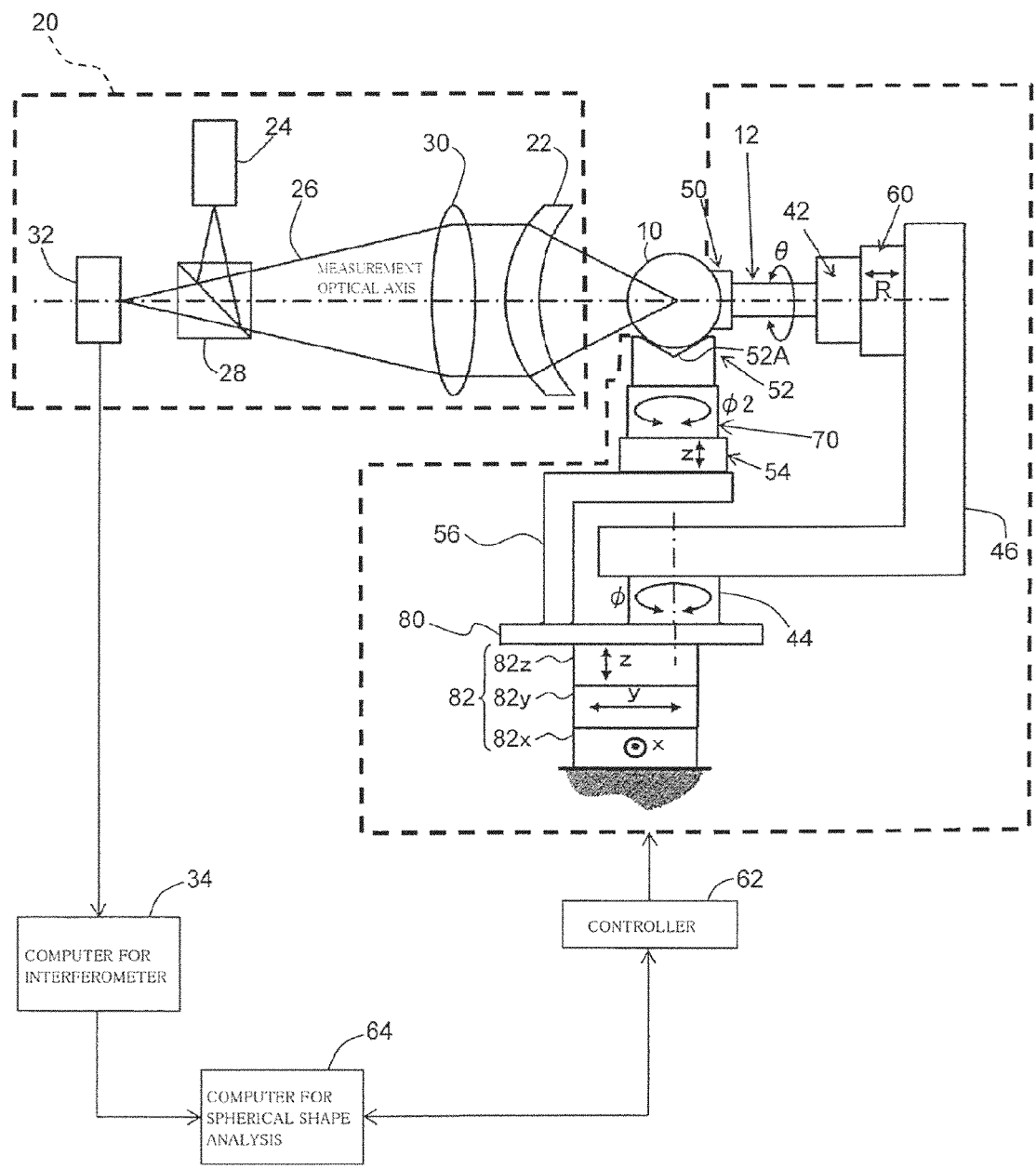
FIG. 19 is a side view of an embodiment of an apparatus according to the present invention.

FIG. 19 shows an apparatus to embody the present invention.

In this embodiment, a θ rotation axis 70 for rotating the sphere support table 52 independently of the θ rotation axis 42, and three axes movement mechanism 82, which is composed of an x axial direction movement mechanism 82*x*, a y axial direction movement mechanism 82*y*, and a z axial direction movement mechanism 82*z* for moving a base 80 on which the φ rotation axis 44 and the sphere holding mechanism 50 are mounted in three axes directions of x, y, and z, are added to the reference example of FIG. 5.

Figure 1:
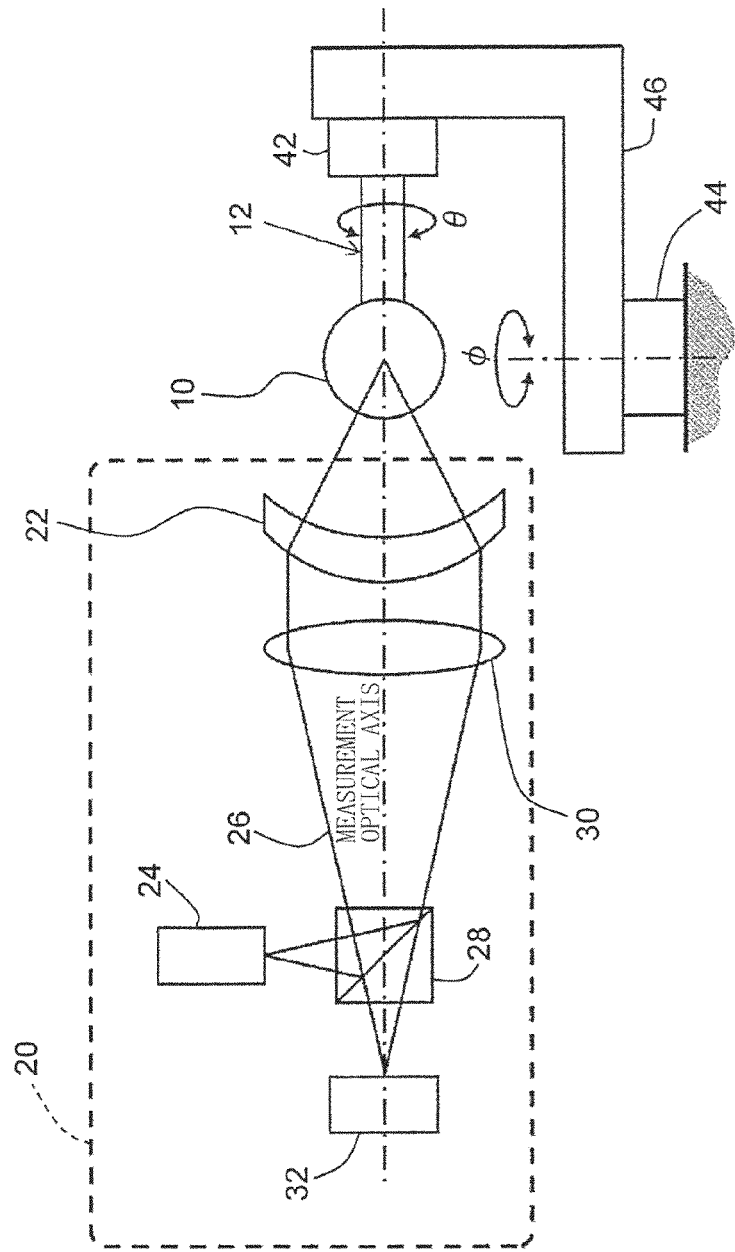
FIG. 1 is a side view illustrating a spherical shape measurement apparatus described in Non-Patent Literature 1.
Figure 2:
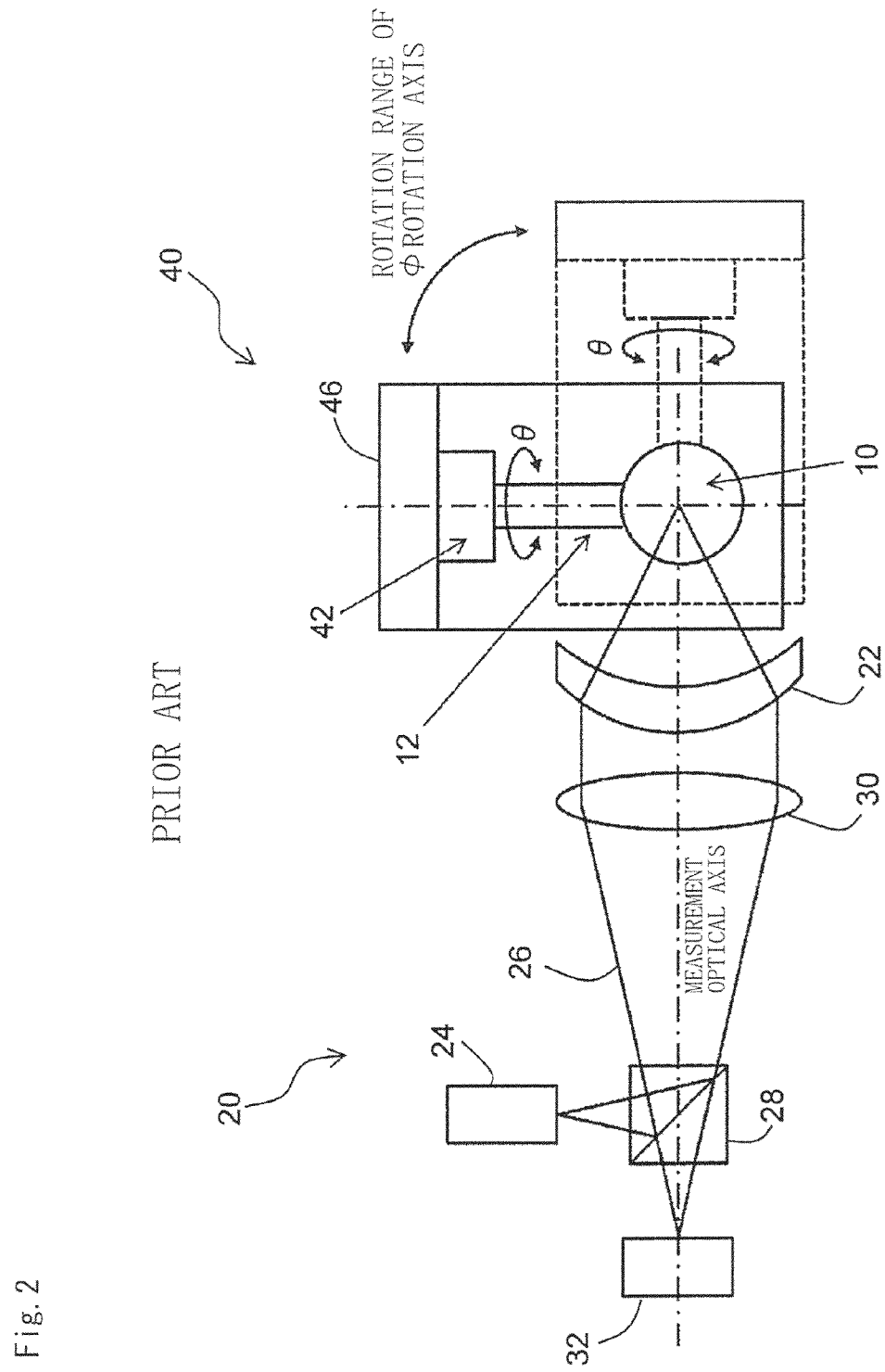
FIG. 2 is a plan view of the spherical shape measurement apparatus of FIG. 1.
Figure 3A:
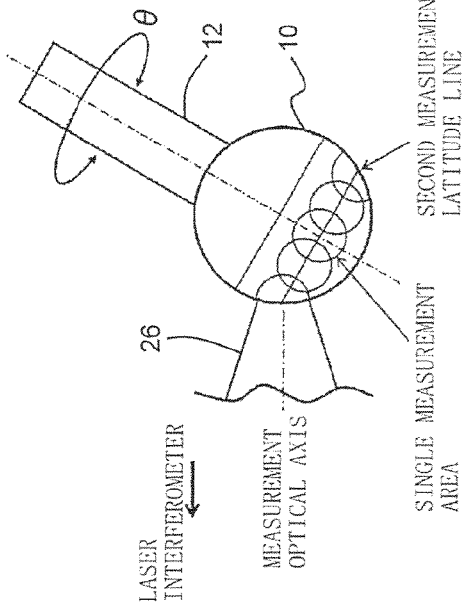
FIG. 3A and FIG. 3B are enlarged plan views for explaining a measurement procedure of the spherical shape measurement apparatus of FIG. 1.
Figure 3B:
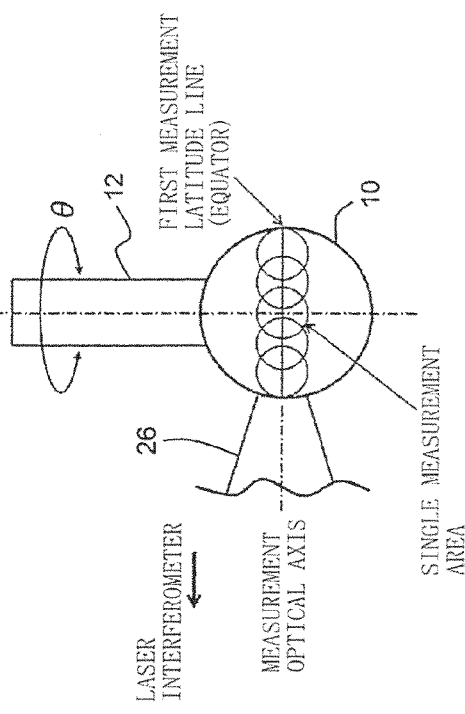
Figure 4:
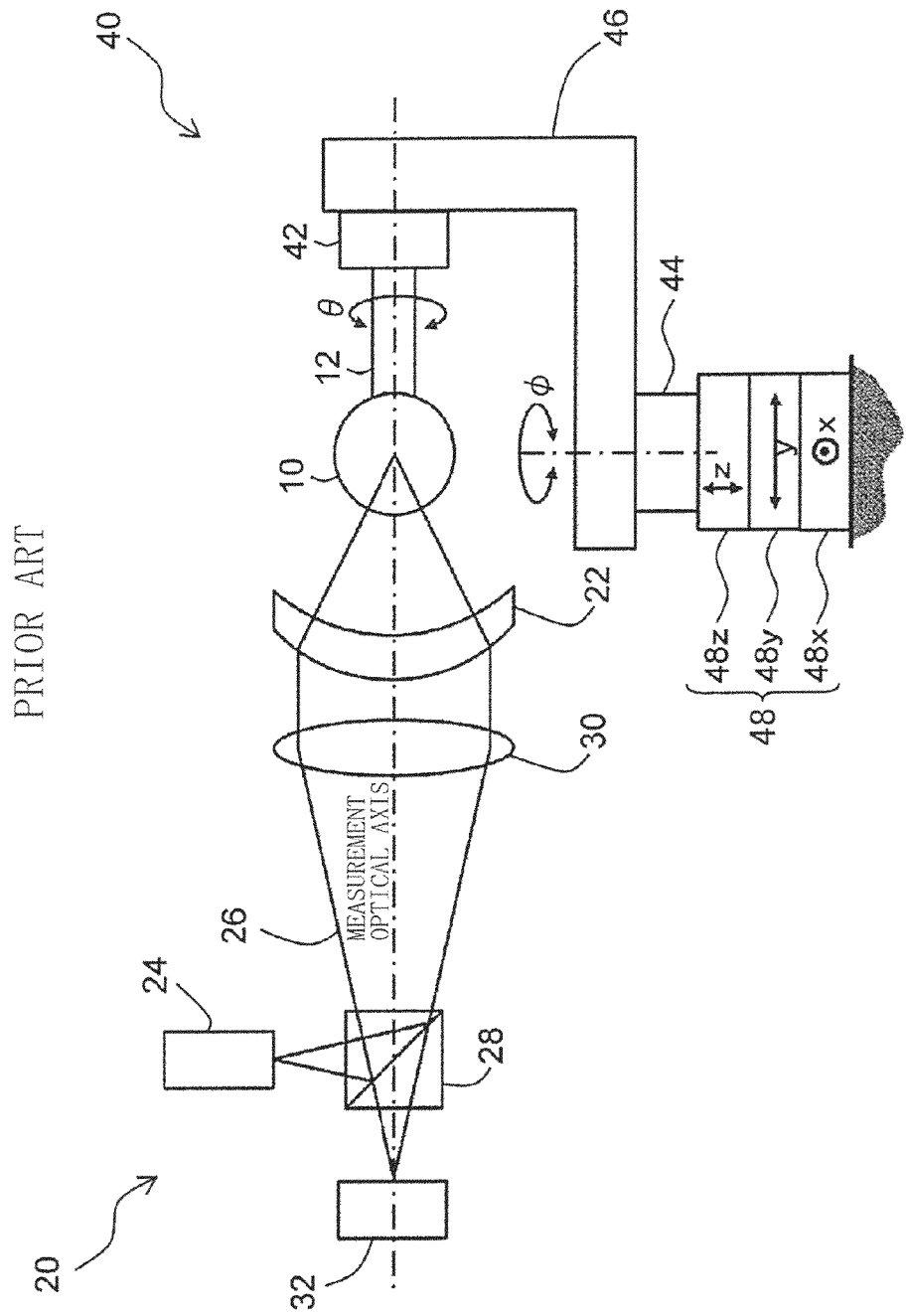
FIG. 4 is a side view of the spherical shape measurement apparatus of FIG. 1, having three axes movement mechanism.

The θ rotation axis 70 is coaxial with the φ rotation axis 44. The φ2 rotation axis 70, which is coaxial with the φ rotation axis 44, rotates the sphere support table 52 to perform the re-holding operation of the sphere. Thereby, it is possible to stably re-hold the sphere, even if there is eccentricity of the support shaft 12 or whirling of the φ rotation axis 44. The φ rotation axis 44 may have a rotation range of 0 degree to 90 degrees, just as with the conventional technique shown in FIG. 1. Note that, the position of providing the φ2 rotation axis 70 is not limited to between the lift axis 54 in Z direction and the sphere support table 52, and may be between the lift axis 54 in Z direction and the base 56.

In the drawing, a reference numeral 34 refers to a computer for the laser interferometer 20. A reference numeral 62 refers to a controller for controlling rotation of the θ rotation axis 42 and the φ rotation axis 44 of the measurement position change mechanism 40, attraction of the sphere hold mechanism 50, ascent and descent of the lift axis 54 in Z direction, expansion and contraction of the adjustment axis 60 in R direction, rotation of the φ2 rotation axis 70, operation of the three axes movement mechanism 82, and the like. A reference numeral 64 refers to a computer for analyzing a spherical shape on the basis of information obtained by the computer 34, while controlling the measurement position change mechanism 40 and the re-holding of a sphere through the controller 62.

According to this embodiment, a sphere is precisely re-held even if the measurement position change mechanism 40 has a movement error or the like, and it is possible to measure the entire part of a sphere surface with high accuracy with an reduced effect of a measurement error owing to a positional displacement between the sphere 10 and the surface shape measurement unit caused by the movement error of the measurement position change mechanism 40 or difference in dimension of a component from a design value.

The structures of the apparatuses described above are just examples, and another structure is adoptable so long as an apparatus operates equivalently. For example, the position of the lift axis 54 in Z direction and the φ2 rotation axis 70 may be changed, and the lift axis 54 in Z direction may be provided on the φ2 rotation axis 70. Like this example, order of configuration of the axes and the like are flexibly changeable so long as the apparatus operates equivalently as a whole. Moreover, the positional relation between the θ rotation axis 42 and the φ rotation axis 44 is not necessarily orthogonal, and is changeable so long as the θ rotation axis 42 and the φ rotation axis 44 operates equivalently. Furthermore, the φ2 rotation axis 70 and the three axes movement mechanism 82 may be omitted.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

The invention claimed is:

1. A spherical shape measurement method for measuring a surface shape, the method including:
    freely rotating a sphere to be measured;
    measuring a partial spherical shape of each measurement area, which is established so as to have an area overlapping with another measurement area adjacent to each other, at each rotation position; and
    joining the partial spherical shapes of the measurement areas by a stitching operation based on a shape of the overlapping area, thereby measuring the surface shape, the method comprising the steps of:
    enabling the sphere to be re-held at a different position; and
    separating a positional displacement between half parts of the sphere before and after re-holding, which is caused by an effect of an error owing to the re-holding of the sphere, into three rotational components, performing quantification of magnitudes of the three rotational components by image correlation, correcting the positional displacement, and thereafter performing the stitching operation to measure entire part of sphere surface.

2. The spherical shape measurement method according to claim 1, wherein the image correlation is image correlation of only translation.

3. The spherical shape measurement method according to claim 2, wherein the three rotational components are displacements about three axes including a polar axis of the half parts of the sphere before and after the re-holding, respectively.

4. The spherical shape measurement method according to claim 1, wherein the image correlation includes image correlation for correcting rotation.

5. A spherical shape measurement apparatus comprising:
    surface shape measurement unit for measuring a partial shape of a spherical surface; and
    measurement position change mechanism for freely rotating a sphere to be measured relative to the surface shape measurement unit, the surface shape measurement unit measuring a partial spherical shape of each measurement area, which is established so as to have an area overlapping with another measurement area adjacent so each other, at each rotation position, the surface shape being measured by joining the partial spherical shapes of the measurement areas by a stitching operation based on a shape of an overlapping area, wherein
    the spherical shape measurement apparatus further comprises:
    a sphere hold mechanism to which the sphere is freely attachable and detachable;
    a sphere support table for holding the sphere detached from the sphere hold mechanism;
    a controller for chancing a position at which the sphere is re-held; and
    a computer for separating a positional displacement between half parts of the sphere before and after re-holding, which is caused by an effect of an error owing to the re-holding of the sphere, into three rotational components, performing quantification of magnitudes of the three rotational components by image correlation, correcting the positional displacement, and thereafter performing the stitching operation to measure entre part of sphere surface.

6. The spherical shape measurement apparatus according to claim 5, wherein
    the surface shape measurement unit is a laser interferometer, and
    the measurement position chance mechanism rotates the sphere about a first rotation axis and a second rotation axis orthogonal to the first rotation axis.

7. The spherical shape measurement apparatus according to claim 5, wherein the sphere support table has a recess at a top surface thereof to receive and support the sphere detached from the sphere hold mechanism therein.

8. The spherical shape measurement apparatus according to claim 5, further comprising a mechanism for moving up and down the sphere support table.

9. The spherical shape measurement apparatus according to claim 5, further comprising a mechanism for retracting the sphere hold mechanism, while the sphere is detached.

10. The spherical shape measurement apparatus according to claim 5, further comprising a mechanism for rotating the sphere support table.

11. The spherical shape measurement apparatus according to claim 10, wherein a rotation axis of the mechanism for rotating the sphere support table and the second rotation axis of the measurement position change mechanism are coaxial with each other.

12. The spherical shape measurement apparatus according to claim 5, further comprising a movement mechanism in three axes directions to adjust a relative position between the sphere and the surface shape measurement unit.

* * * * *